June 26, 1945. J. G. OETZEL 2,378,943
BRAKE
Filed April 7, 1941 4 Sheets-Sheet 1

Fig. 1

INVENTOR
John George Oetzel
By Parker, Carlson, Pitzner & Hubbard
ATTORNEYS

Fig. 4

Patented June 26, 1945

2,378,943

UNITED STATES PATENT OFFICE 2,378,943

BRAKE

John George Oetzel, Beloit, Wis., assignor to Warner Electric Brake Manufacturing Company, South Beloit, Ill., a corporation of Illinois Application April 7, 1941, Serial No. 387,187

30 Claims. (Cl. 188—138)

This invention relates generally to friction brakes of the character commonly used on heavy duty automotive vehicles and, in certain of its aspects, has more particular reference to brakes of the type in which the primary actuating force is derived from the momentum of the part whose motion is to be controlled.

The general object of the present invention is to provide a brake of the above general character which may be constructed to produce a substantially greater retarding effect than prior brakes of similar character, in which the operating parts may be arranged within the limited space available for brake equipment in modern vehicle wheels, which provides for efficient dissipation of frictional heat, which is self-adjusting throughout the life of the friction linings, which becomes applied in a minimum movement of the braked part following energization of the primary momentum operator, and which is comparatively simple and inexpensive in construction and reliable in operation. In carrying out this object, the invention contemplates the use of a torque amplifying mechanism of novel character interposed between the controllable momentum operator and the main brake and operable to amplify the derived actuating force to the main brake with a mechanical advantage several times as great as that obtainable with prior mechanisms, and this without sacrifice in controllability of the brake.

Another object is to provide a friction brake mechanism of the self-energizing type in which the applied actuating force is amplified to a substantially greater degree than in prior brakes without sacrificing controllability of the total retarding force.

A more detailed object is to provide an intermediate torque amplifying mechanism which derives a secondary actuating force from the momentum of the part being braked through the use of a plurality of radially expansible and circumferentially spaced friction elements individually anchored and actuated.

Another object is to provide a brake in which the initial actuating force is augmented in part by a self-energizing action and in part by direct mechanical amplification whereby to preserve accurate controllability of the brake.

The invention also resides in the novel arrangement of the parts to attain radial and axial compactness and efficient heat dissipation.

Other objects and advantages of the invention will become apparent from the following detailed description taken in connection with the accompanying drawings, in which

Fig. 4 is a section taken along the line 4—4 of Fig. 2 with certain of the parts shown in section taken along the line 4a—4a.

While the invention is susceptible of various modifications and alternative constructions, I have shown in the drawings and will herein describe in detail a preferred embodiment. It is to be understood, however, that I do not intend to limit the invention by such disclosure but aim to cover all modifications and alternative constructions and uses falling within the spirit and scope of the invention as expressed in the appended claims.

The brake shown in the drawings as embodying the present invention is of the internal expanding type adapted to be used with a drum 11 on the wheel 9 of a modern heavy duty vehicle. It comprises generally a main friction brake 10 adapted for gripping engagement with an internal surface on the drum 11, a momentum type friction operator 12, preferably controlled electromagnetically, and a novel mechanism for augmenting many fold the actuating force derived by the operator and for utilizing the amplified force to energize or expand the main brake 10. All of the movable parts are disposed in a narrow radial space within the drum and are arranged in a novel manner for efficient dissipation of the heat generated when the brake is applied.

Figure 1:
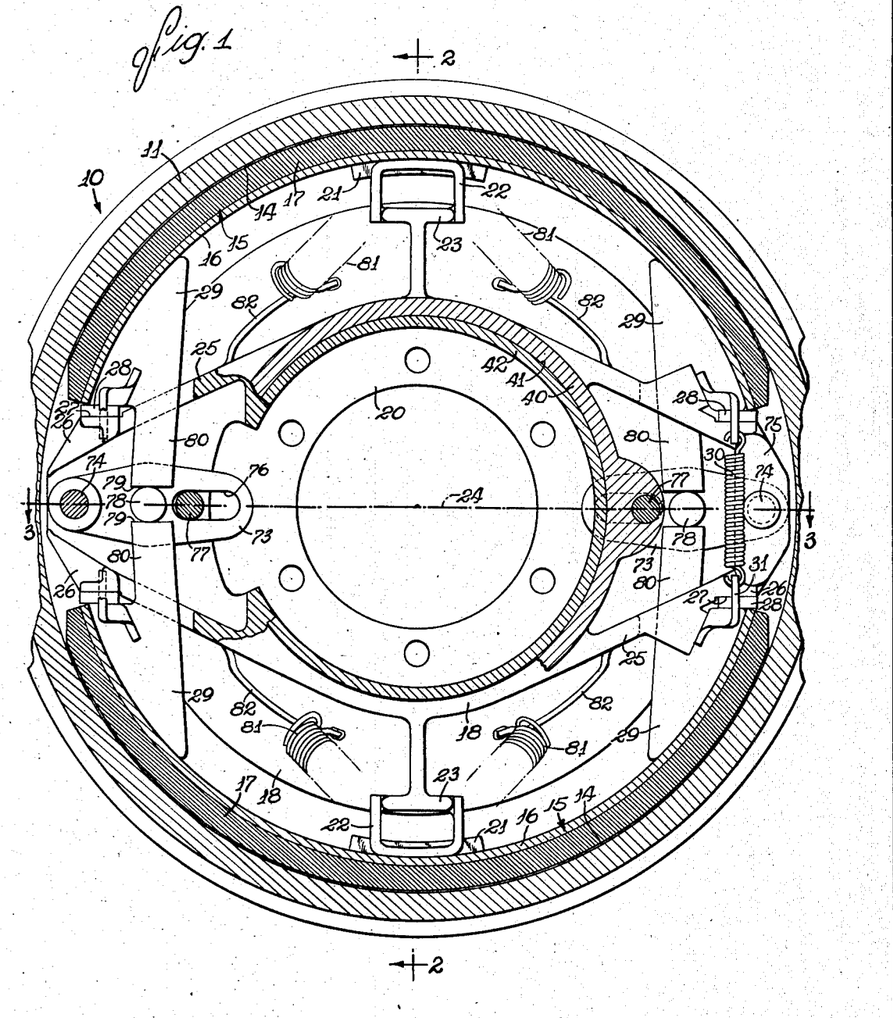
Figure 1 is an axial sectional view of a brake embodying the novel features of the present invention, the brake being shown disposed within a rotatable drum and the section being taken along the line 1—1 of Fig. 2.

The drum has an inturned flange 13 bolted to a vehicle wheel and near its open end provides an internal cylindrical surface 14 adapted to be gripped by the non-rotatable friction element of the main brake 10. Herein this element comprises two semi-circular shoes 15 (Figs. 1 and 2), either flexible or rigid, arranged in end-to-end relation around the surface 14 and each comprising a curved band 16 having a segment 17 of friction material secured to its outer surface.

The shoes are supported by an anchor member in the form of a casting 18 fastened by bolts 19 to a plate 20 which closes the open end of the drum and is mounted in any suitable way on the wheel axle or other non-rotatable part of the vehicle. Elongated lugs 21 welded along the center line of the shoe bands 16 are received in guide notches on brackets 22 which are rigid with lugs 23 on the anchor member 18. Thus, the shoe is held against lateral movement but guided longitudinally during its expansion.

Along a diameter 24 extending between the pairs of adjacent shoe ends, the anchor member 10 has two outwardly converging arms 25 each having a pair of spaced lugs 26 projecting laterally from its outer end. These lugs provide abutments 27 engageable with blocks 28 on brackets 29 welded along the inner surfaces of the shoe bands 16, the abutments preferably extending parallel to the diameter 24. Pairs of coiled contractile springs 30 are stretched between lugs 31 secured to the brackets 29 and urge the shoe ends to normal brake-released position against the abutments 27.

The operator 12 for deriving the initial or primary actuating force from the momentum of the moving vehicle comprises driving and driven friction rings 34 and 33 concentric with the drum axis and adapted for axial gripping engagement, the degree of which may be varied selectively to regulate the magnitude of the actuating force and therefore the ultimate retarding effect. Preferably, the gripping engagement is produced magnetically according to the degree of energization of a winding 35 disposed between the two annular poles 36 of the magnet ring. The pole faces 37 are flush with the surface of friction material 38 supported between the poles. The magnet is mounted for oscillation about the drum axis being in this instance carried by a bushing 39 supported and backed by a member 40. For a purpose to appear later, this member is rotatably mounted on the external surface 41 of a cylindrical flange 42 integral with the anchor casting 18. It will be observed that the magnet is located near the closed end of the drum and thus axially spaced inwardly from the main brake 10.

The armature ring 34 is substantially flat and is supported from the drum flange 13 through the medium of tangentially extending spring arms 43. These not only sustain the torque frictionally applied to the armature but continuously urge the latter into light mechanical contact with the magnet face.

The degree of gripping engagement between the rings 33 and 34 and, therefore, the magnitude of the actuating force derived from the momentum of the vehicle is controlled by regulating the current energizing the magnet winding 35. This may be accomplished by actuating a control member such as a foot pedal 44 to adjust a rheostat 45 in the energizing circuit of the magnet which includes the vehicle battery 45ª.

In brakes of the above general character, the prior practice has been to apply the primary actuating force frictionally derived by the momentum operator 12 directly to the main brake usually through levers, toggles, cams or the like. The present invention contemplates amplifying this actuating force in part by applying it to an auxiliary momentum operator 46 to derive a secondary actuating force from the momentum of the vehicle and in part by direct mechanical augmentation, the amplified force being then utilized to energize the main brake 10. The operator 46 is a friction device which operates with a self-energizing or wrapping action and, in this instance, is of the same general construction as the main brake 10 and includes as its driving element a zone 47 of the internal drum surface axially spaced toward the flange 13 from the main surface 14.

The driven element of the secondary device comprises two semi-circular shoes 48 covered with friction material 49 and arranged end to end within the drum with their adjacent ends spaced apart and disposed on opposite sides of a diameter 50 which is at right angles to the diameter 24. To guide the shoes 48 longitudinally, lugs 51 coact with yokes 52 secured to lugs 53 projecting radially from the auxiliary anchor member 40 along the diameter 24. Arms 54 on this member project to points adjacent the drum and each has integral therewith two laterally projecting spaced lugs 54'. These provide oppositely facing abutments 55 engageable with plates 56 on brackets 57 secured along the center line of the shoes 48. Contractile springs 58 normally maintain the shoes contracted.

Figure 2:
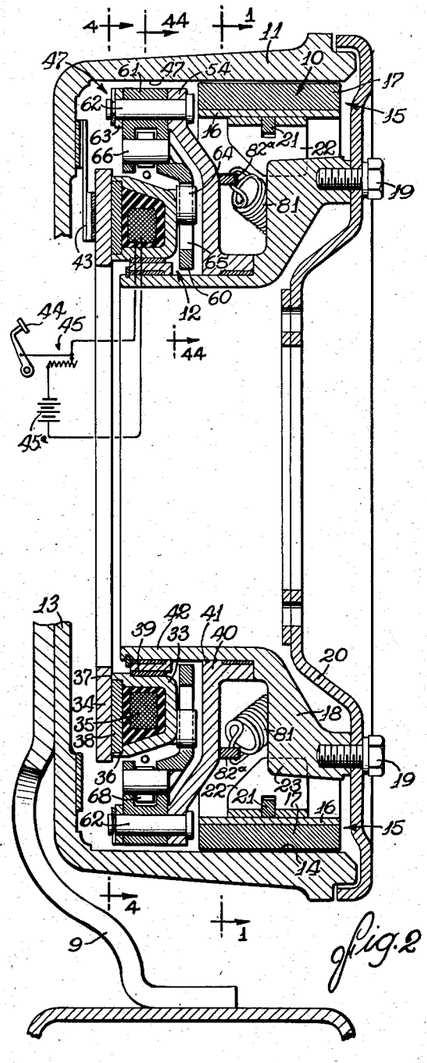
Figs. 2 and 3 are sections taken along the lines 2—2 and 3—3 of Fig. 1.
Figure 3:
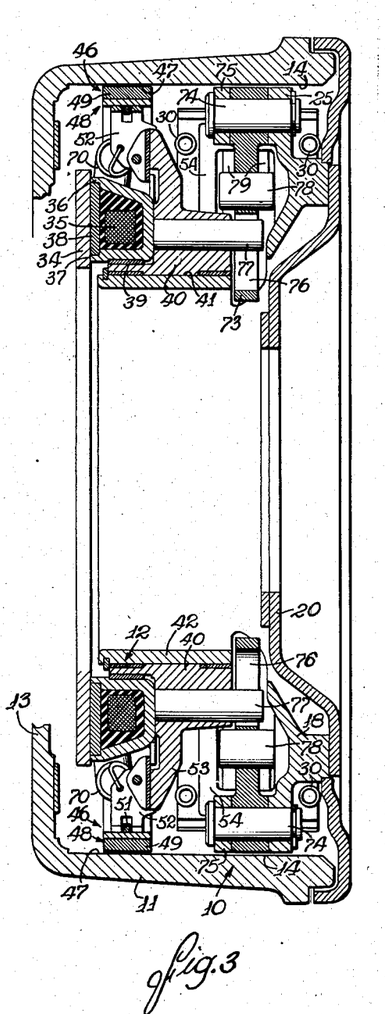
Figure 4:
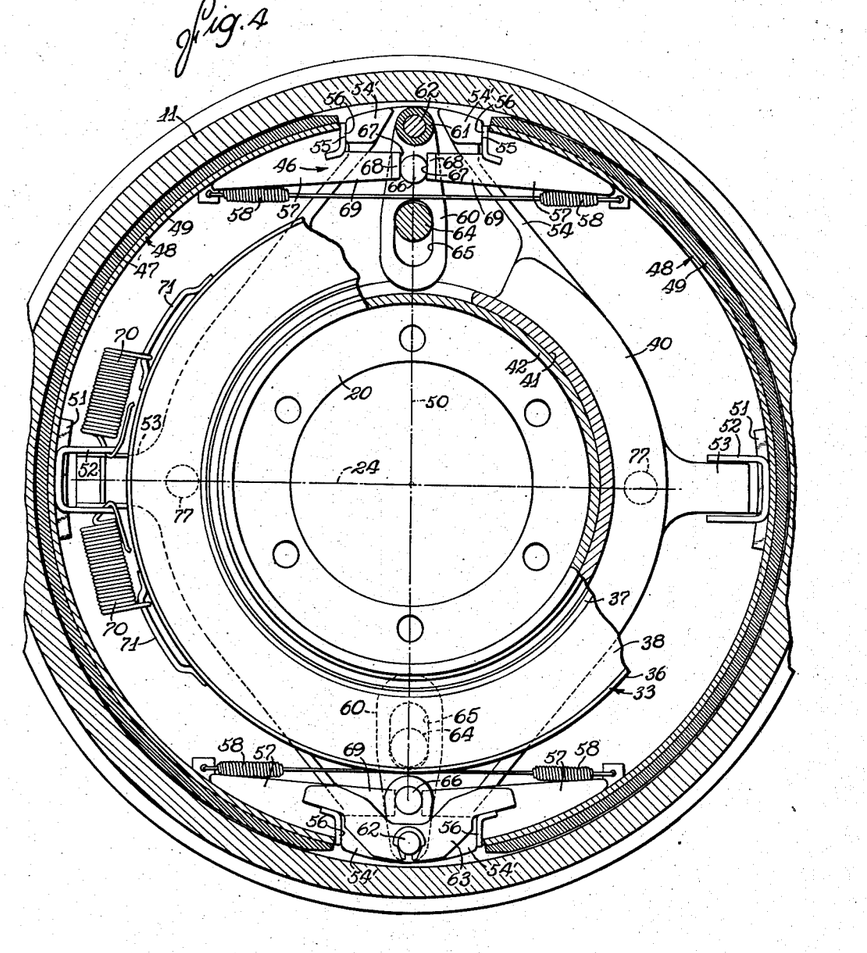

The primary actuating force derived by the momentum operator 12 may be applied directly to energize the secondary operator 46. In this instance, however, the force is amplified by means of cranks 60 having a hub 61 pivoted on a pin 62 which is disposed between the lugs 54' parallel to the drum axis and which is supported at one end by the arm 54 and at the other end by a plate 63 connecting the lug ends. In brake-released position, the cranks project inwardly along the diameter 50 and their free ends are offset laterally so as to lie along the back of the magnet (Fig. 2). A pin 64 rigid with the magnet projects into an elongated slot 65 in the crank. Substantially in the plane of the shoes 48 and at points near the pivots 62, the cranks 60 carry pins 66 which bear against the flat surfaces 67 of blocks 68 on the ends of extensions 69 of the shoe brackets 57. By virtue of these connections between the magnets and the shoe ends, one shoe 48 or the other is moved away from its anchor and the driven friction element of the secondary momentum actuator is expanded against the drum as the magnet moves (see Fig. 5) in either direction away from released position. Contractile springs 70 stretched between the yokes 52 on the auxiliary anchor member 40 and elongated eyes 71 on the magnet tend to maintain the magnet in the released position shown in Fig. 4 and to return it to this position after deenergization.

When the shoes 48 are thus expanded into gripping engagement with the drum, the surface 47 of the latter exerts a frictional force on the shoes tending to move the shoes and their supporting member 40 in the direction of drum rotation. Such movement is permitted because of the mounting of the auxiliary member 40 on the main anchor member 18 for oscillation about the drum axis. This frictional force is augmented several times by virtue of the self-energizing or wrapping action which builds up progressively throughout the lengths of the relatively flexible shoes 48. However, because the shoe surfaces do not exceed a semi-circle, this wrapping action remains under control and the resultant force is always proportional to the primary actuating force exerted on the magnet face.

Any suitable mechanical movement may be employed to apply the secondary actuating force thus derived by the auxiliary operator 46 to the main brake 10. Herein, cranks 73 are pivoted on pins 74 disposed between the lugs 26 on the main anchor member 18 and supported by this member and a plate 75 connecting the lugs. The free inner ends of the cranks have slots 76 receiving pins 77 projecting from the auxiliary anchor member 40 toward the open end of the drum and parallel to the drum axis. Pins 78 projecting from opposite sides of the cranks 73 engage the flat ends 79 of extensions 80 of the main shoe brackets 29. As a result, the cranks 73 are actuated and the shoes 15 expanded to energize the main brake whenever the member 40 moves away from brake-released position. Contractile springs 81 stretched between lugs 82$^a$ on the floating anchor member 40 and stationary elongated eyes 82 welded at opposite ends to the stationary anchor member 18 urge the member 40 toward brake-released position while permitting freedom of movement in either direction away from such position.

Figures 5, 6, 7:
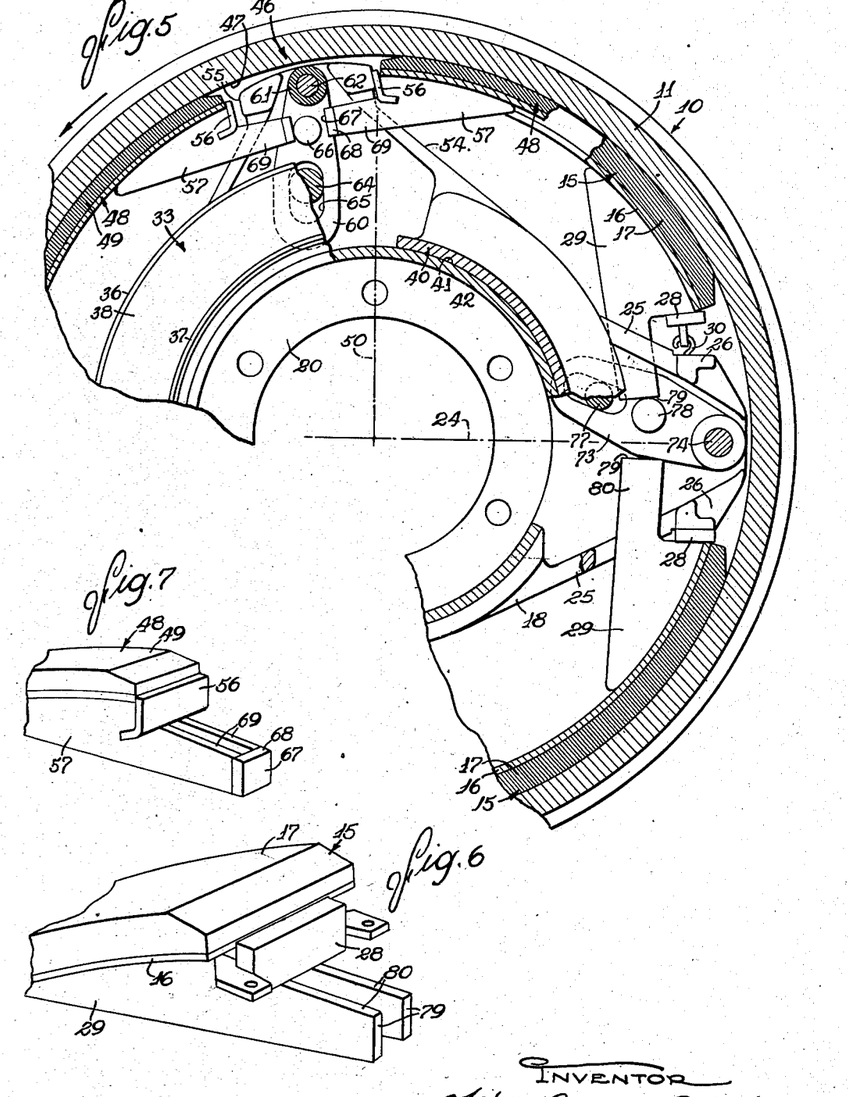
Fig. 5 is a fragmentary view similar to Fig. 1 showing the elements in actuated positions.
Figs. 6 and 7 are fragmentary perspective views of the main and auxiliary friction elements.

Assuming that the parts are in released positions (Figs. 1 to 4), the complete operation is as follows. When the magnet is energized, the armature 34 is attracted to the magnet with a force proportional to the energizing current. As a result of such axial gripping, the driving frictional ring or armature 34 applies to the face of the magnet 33 a friction force derived from the momentum of the rotating part and directed circumferentially in the direction of drum rotation. The magnet ring moves actuating the cranks 60 and expanding the shoes 48 against the drum surface 47 as shown in Fig. 5, after which slippage occurs between the magnet and armature rings. Thus, the primary actuating force derived through the magnetic friction device is not transmitted to the main shoes but instead is utilized to energize the secondary momentum operator 46 and thereby cause a greatly increased actuating force to be derived from the momentum of the vehicle by the self-energizing action which builds up in the shoes 48 while the latter are expanded. The frictional force thus applied to the shoe surfaces by the drum causes the member 40 carrying the shoes to turn with the drum and thus swing the cranks 73 to expand the main shoes 15. When the latter become expanded fully (see Fig. 5), slippage occurs between the shoes 48 and the drum surface 47, the augmented actuating force continuing to be applied. Now, when the magnet is deenergized, the parts are all returned to their normal positions by the springs 30, 58, 70 and 81.

The important part which the intermediate momentum operator 46 plays in amplifying the torque ($t_m$) derived frictionally by the momentum operator 12 will be apparent from the following formulae:

Torque ($T_a$) on shoes $48 = t_m \frac{B}{d_m} C_1 (b_1 - 1)$

Torque ($T_s$) on shoes $15 = t_m \frac{B}{d_m} C_1 \frac{d_a}{d_s} C_2 b_1 (b_2 - 1)$ Total torque $(T) = T_s + T_a + t_m$ $$T = t_m \left[ \frac{B}{d_m} C_1 \frac{d_a}{d_s} C_2 b_1 (b_2 - 1) + \frac{B}{d_m} C_1 (b_1 - 1) + 1 \right]$$

where

B is the internal diameter of drum.
$d_m$ is the diameter of magnet between centers of pins 64.
$C_1$ is the lever ratio of cranks 60.
$C_2$ is the lever ratio of cranks 73.
$d_a$ is the diametrical spacing of the anchors 56.
$d_s$ is the diameter between centers of pins 77.
$b_1$ is the wrap factor of shoes 48.
$b_2$ is the wrap factor of shoes 15.

The wrap factors are determined by the well known formula $b = 10^{0.0076 af}$ where $a$ is the angle of contact of the friction element with the drum surface and $f$ is the coefficient of friction. In the brake shown, the factor ($b_1$) for the shoes 48 is approximately 2.68 while ($b_2$) is about 2.04.

Assuming, for example, that $C_1$ is 3.07, $C_2$ is 1.58, $B/d_m$ is 1.76, and $d_a/d_s$ is 1.73, the torque $T_a$ on the auxiliary shoes 48 would be 9.08 times the magnet torque and the torque on the shoes 15 would be 48.7 times this torque. Thus, for a magnet torque of 2085 inch-pounds, the total torque $$[t_m(2085) + T_a(18,900) + T_s(101,500)]$$

would be 122,485 inch-pounds. It will be observed that, in addition to constituting the primary and secondary actuating forces, the friction forces exerted on the driven elements of the momentum operators 12 and 46 contribute to the total retarding force and that the secondary torque is a substantial proportion of the total.

As a torque amplifier in the present environment, the intermediate momentum operator 46 possesses numerous advantages over cams, levers, or the like. In the first place, it is circular in form and its parts move only circumferentially. Therefore, it may be arranged compactly in the narrow radial space available within the wheel of a modern automotive vehicle.

Secondly, its magnification of the torque is large due to the self-energizing action described above. With the half wrap friction elements or shoes 48, the amplification is multiplied nine fold without any sacrifice in constancy of action or controllability of the total braking effect.

Thirdly, it performs its function without necessitating a corresponding multiplication in the movement of the magnet and therefore of the vehicle in order to apply the brake. Thus, when the friction surfaces of the brake described above are new, the shoe clearances will be taken up and the brake applied by turning of the wheel throughout five degrees following energization of the magnet. When the shoes are worn off completely, about twenty-eight degrees is required. This corresponds to about 9.2 inches of movement of the vehicle. In other words, the torque applied by the main brake shoes 15 in retarding the drum in the example given above is 48.7 times the primary actuating torque derived by the magnetic friction device, whereas the movement of the magnet is only 5.6 times that of the actuated end of the main brake shoes. Now, if the same amplification of the magnet torque were produced by levers or other similar torque multiplying devices, a leverage ratio of 57.8 would be required and the vehicle movement required to set the brake with the shoes worn out would be about 35.5 inches. Such brakes would be unsuited for use in modern traffic.

The friction type of torque amplifier is adjustable automatically for wear and does not require frequent servicing. This is because wearing off of the friction surfaces simply requires a further movement of the drum during each brake application.

The brake above described may be constructed in many capacities by the use of many common parts. For example, to increase its capacity, it is merely necessary to increase the mechanical advantages of the lever mechanisms 60 and 73. This involves changes in only a few of the parts. Also, the leverage ratios may be distributed in any manner desired and the friction parts constructed for maximum efficiency in dissipation of the friction heat created at the three different pairs of coacting surfaces.

The invention also contemplates a construction of the parts and distribution of the unit pressures on the friction surfaces so that the coverings 17 and 49 will wear out approximately simultaneously and, at the same time, the clearance between the shoes 48 and the drum, when the shoes are worn, will be so small as not to require objectionably large movement of the vehicle in setting the brake following energization of the magnet. For this purpose, the covering 49 is made relatively thin as compared to the main shoe covering 17, approximately one-half the thickness of the latter or about one-fourth of an inch in the present instance. The total worn out clearance is thus limited and accordingly the angular movement of the drum necessary to set the brakes when the covering 49 is exhausted. This reduction in thickness of the covering 49 is compensated for and wearing out of the linings equalized by making the covering sufficiently wide to provide a substantially lower unit pressure than that on the main shoes. Thus, with a magnet torque of 2085 inch-pounds, as in the example given above, and with the covering 49 composed of standard brake lining 1.75 inches wide, it can be shown mathematically that the maximum pressure applied to the shoes 48 is 105 pounds per square inch. If the main shoe coverings 17 are 4.5 inches wide, the unit pressure applied thereto by the same magnet torque would be 265. Under these pressures, the covering 49 will wear down approximately one-half as fast as the covering 17 and the two will give approximately the same length of service.

The arrangement of the parts as above described is advantageous from the standpoint of radial and axial compactness, efficient heat dissipation, and ruggedness of construction. The magnetic momentum operator is located within the secondary or intermediate operator which promotes axial compactness and minimizes the stresses on the parts supporting the armature as well as those transmitting the derived force to the secondary operator. The main brake is disposed at the open end of the drum where the anchor member may be utilized to best advantage in sustaining the heavy torque load. Circumferential spacing of the expanders for the main and auxiliary friction devices also promotes axial compactness and ruggedness of mounting. By dividing the friction element of the secondary momentum operator into a plurality of annularly spaced parts and providing individual anchors and actuators for these parts, the wrapping action is kept within controllable limits. As shown, the effective wrap angle of each part is greater than a right angle and less than 180 degrees so that the self-energizing action is an important factor in effecting torque amplification and yet controllability of the brake is not sacrificed. It will be observed that the torque amplification between the magnetic momentum operator and the main brake shoes is effected in part by self-energizing action and part by direct mechanical augmentation of a fixed ratio produced by the levers 60 and 73. By such division, a high amplification is obtained while insuring greater controllability than would be possible if the same amplification were produced by self-energization alone. Mounting on the magnet 33 on the movable anchor member 40 permits the bearing support 41 for this member to be of maximum axial length and therefore possess maximum rigidity.

I claim as my invention:

1. A friction brake having, in combination, two internal cylindrical surfaces axially spaced apart and rotatable about a common axis, two main friction segments arranged in end to end relation and expansible into gripping engagement with one of said surfaces, stationary stops disposed between said adjacent ends for anchoring one or the other end, cranks selectively engageable intermediate their ends with said segment ends and operable to expand said segments, a second pair of auxiliary segments arranged in end to end relation and expansible into gripping engagement with said other cylindrical surface, a member mounted to oscillate about said axis and connected to said cranks to actuate the latter in the direction of rotation of said surfaces, stops on said member selectively anchoring the ends of said auxiliary segments, cranks selectively engageable with the ends of said auxiliary segments and operable to expand the latter, two friction elements adapted for axial gripping engagement, one being rotatable with said cylindrical surfaces, and means connecting the driven friction element to the cranks of said auxiliary segments.

2. A friction brake having, in combination, two internal cylindrical surfaces rotatable about a common axis and disposed with their center lines offset axially from each other, a main friction member expansible into gripping engagement with one of said surfaces, stationary anchoring means for said member, expanding means for said member, a pair of segments arranged in end to end relation and expansible into gripping engagement with said other cylindrical surface, an anchor member mounted to oscillate about said axis and connected to said expanding means to actuate the latter in the direction of rotation of said surfaces, stops on said anchor member selectively anchoring the ends of said segments, cranks selectively engageable with the ends of said segments and operable to expand the latter, a ring disposed within said surfaces and mounted for angular movement about said axis, said ring being connected to said cranks, and selectively controllable means for causing angular motion of said ring with varying degrees of force.

3. A friction brake mechanism for use with a rotatable drum having an inturned flange at one end and two axially offset internal cylindrical surfaces, said brake mechanism comprising a non-rotatable anchor member, a friction element arranged to anchor on said member and adapted for radial expansion into gripping engagement with the internal surface nearest the open end of said drum, an auxiliary anchor member mounted for oscillation about the axis of said friction element, expanding means for said element actuated by said auxiliary member, an auxiliary friction element arranged to anchor on said auxiliary member and adapted for expansion into gripping engagement with said other internal surface, two axially engageable friction members disposed adjacent the flanged end of said drum with the driving member adapted for rotation with the drum and the driven member angularly movable and connected to said auxiliary element for expanding the same upon angular movement of the driven member in either direction from a normal brake-released position, and means controlling the gripping engagement of said friction members.

4. A friction brake having, in combination, a drum and two internal cylindrical surfaces rotatable about a common axis, a main friction element expansible into gripping engagement with one of said surfaces, an auxiliary friction element expansible into gripping engagement with said other cylindrical surface, anchoring means for said auxiliary element mounted to turn about said axis, means movable with said anchoring means to expand said main element, expanding means for said auxiliary element including a member mounted within said drum for angular movement in the plane of drum rotation, power actuated means self-contained within said drum to regulate the angular displacement of said member, and means variably controlling the energization of said power means.

5. The combination of a main friction brake having a friction element rotatable with a part whose motion is to be controlled and a second element radially engageable with said first element and anchored against rotation therewith, a friction device comprising driving and driven friction elements concentric with the rotational axis of said part and adapted for axial gripping engagement to derive an actuating force from the momentum of said part, selectively operable means controlling the degree of such engagement, and means for amplifying said actuating force and applying the amplified force to said brake to actuate the latter including a second friction device having a driving member rotatable with said part and a driven member radially engageable with the driving member by angular movement of said driven element whereby to derive an actuating force from the momentum of said part, said driven member being operatively connected to said anchored friction element.

6. A friction brake for use with two internal cylindrical surfaces and an axially facing surface rotatable about a common axis in unison with a part whose motion is to be controlled, said brake comprising a member frictionally engageable with said axially facing surface, an auxiliary friction element adapted for gripping engagement with one of said cylindrical surfaces and expansible by angular movement of said member, anchoring means for said element movable about said axis and disposed within said cylindrical surfaces, a main friction element adapted for gripping engagement with said other cylindrical surface, stationary anchoring means for said main element, and force amplifying means mounted on said stationary anchoring means for movement relative thereto and actuated by movement of said movable anchoring means, said last mentioned means being operable to expand said main element.

7. The combination of a main friction brake for applying a retarding effect to a part whose motion is to be controlled, a friction momentum operator adapted when energized to derive an actuating force from the momentum of said part, said operator comprising axially engageable magnetic elements having coacting friction faces, an electromagnetic winding carried by one of said elements and energizable selectively to control the magnitude of said actuating force, and means for amplifying said actuating force and applying the amplified force to energize said brake including a second momentum operator energized by said first mentioned actuating force and to derive a secondary actuating force from the momentum of said part.

8. The combination of a main friction brake for applying a retarding effect to a part whose motion is to be controlled, a friction momentum operator adapted when energized to derive an actuating force from the momentum of said part, selectively operable means controlling the energization of said operator, means for amplifying said actuating force and applying the amplified force to energize said brake including a second momentum operator energized by said first mentioned actuating force and to derive a secondary actuating force from the momentum of said part, said second operator comprising an internal cylindrical friction surface rotatable with said part, a plurality of friction segments arranged in end to end relation within said surface, abutment anchors for said ends, and means actuated by said first operator to move one end or the other of each segment away from its anchor.

9. The combination of a main friction brake for applying a retarding effect to a part whose motion is to be controlled, a friction momentum operator adapted when energized to derive an actuating force from the momentum of said part, selectively operable means controlling the energization of said operator, and means for amplifying said actuating force and applying the amplified force to energize said brake including lever mechanism and a second momentum operator energized by said first mentioned actuating force and deriving a secondary actuating force from the momentum of said part, said brake and said second operator having cylindrical friction surfaces rotatable with said part and said first operator having axially engageable friction elements one rotatable with said part.

10. A brake mechanism for use with a rotatable drum having an internal cylindrical surface, said mechanism comprising a non-rotatable anchor member adapted to be supported within said drum, a main friction element supported by said member and adapted for expansion into engagement with said surface, a second member rotatably supported on said anchor member, a second friction element anchored on said second member and adapted for expansion into engagement with a second internal cylindrical surface rotatable with said drum, and power actuated means supported by said second member for movement therewith and operable when energized to move relative to the second member and expand said second element.

11. A friction brake having, in combination, an expansible element having a non-rotatable anchor, a lining of friction material fastened to the outer periphery of said element, a second expansible element having a circumferentially floating anchor, a second substantially thinner lining fastened to the outer periphery of said second element and correlated in width and thickness to said first lining, selectively controllable means for expanding said second element, and expanding means for said first element actuated by circumferential movement of said floating anchor and operable to expand the element under a unit pressure substantially greater than that applied to said second element.

12. A friction brake for use with a rotatable drum open at one end and two internal cylindrical surfaces concentric with the drum axis and rotatable with the drum, said brake comprising an anchor member, a main friction element anchored on said member and adapted for expansion, an auxiliary friction element adapted for radial expansion and disposed adjacent but axially offset relative to said main element, anchoring means for said auxiliary friction element mounted on said member to turn about the axes of said elements, expanding means for said auxiliary element, actuating means for said expanding means including two friction rings mounted within said auxiliary element substantially in the plane thereof, one of said rings being mountable for rotation with said drum and the other being rotatable about said axes and connected to said expanding means, and selectively operable means controlling the degree of gripping engagement between said rings, said main and auxiliary friction elements being engageable respectively with the surfaces of said drum which are respectively disposed adjacent and remote from the open end of the drum when said brake mechanism is mounted therein.

13. A friction brake having, in combination, a rotatable drum open at one end and closed at the other end and providing two internal cylindrical surfaces concentric with the drum axis with their center lines axially spaced therealong, an anchor member disposed adjacent said open end and projecting into the drum, a main friction element anchored on said member and expansible into gripping engagement with the one of said surfaces nearer said anchor member and said open drum end, said element having circumferentially separable parts, an auxiliary friction element adapted for gripping engagement with the major circumferential length of the other cylindrical surface, anchoring means for said auxiliary friction element mounted on said member to turn about said drum axis when the element is expanded against said drum, expanding means for said auxiliary element, selectively controllable actuating means for said expanding means, and means actuated selectively according to the direction of movement of said anchoring means following engagement of said auxiliary element with its rotatable surface to move one of said separable parts of said main element away from its anchor on said member and in the direction of drum rotation while leaving the other part fixed against its anchor.

14. A friction brake having, in combination, a non-rotatable anchor member, a main friction element anchored on said member and radially expansible, an auxiliary friction element adapted for radial expansion, anchoring means for said auxiliary friction element mounted to turn about the axis of said main element, means connecting said movable anchoring means and said main friction element and operable to expand the latter upon movement away from a normal brake-released position, expanding means for said auxiliary element, actuating means for said expanding means including two axially engageably friction elements, one mounted on said movable anchoring means for movement relative thereto about said axis, and selectively operable means controlling the degree of gripping engagement between said last mentioned friction elements.

15. A friction brake having, in combination, a main friction braking member comprising circumferentially spaced parts adapted to anchor at one of their ends and movable to radially expand and contract the periphery of the member, individual means for actuating the respective parts to expand said member, a plurality of friction elements arranged in end to end relation adjacent said member and adapted for radial expansion, an anchor member mounted to oscillate about the axis of said main friction member and providing anchors for each of said elements, means connecting said anchor member and each of said individual actuating means to move the latter and cause expansion of said main braking member, separate means for moving the respective elements to expand the same against their coacting rotatable surface, and selectively controllable means for actuating said last mentioned means in unison.

16. A friction brake having, in combination, a main friction element having a radially expansible outer peripheral surface, said element having ends spaced apart on one side of the said surface, non-rotatable means anchoring said element, an anchor member mounted to turn about the axis of said element, means connecting said anchor member and at least one of said ends to expand said element on movement of the anchor member, an auxiliary friction element having a radially expansible outer periphery and comprising a plurality of annularly spaced separate parts providing a plurality of annularly spaced pairs of ends angularly spaced from the ends of said main element, each of said parts being adapted to anchor on said member, and selectively controllable expanding means for said auxiliary element for applying individual actuating forces simultaneously to ends of the different parts.

17. A friction brake having, in combination, two internal cylindrical surfaces axially offset and rotatable about a common axis, a plurality of main friction segments arranged in end to end relation and expansible into gripping engagement with one of said surfaces, stationary stops associated with said adjacent ends for anchoring one or the other end, lever means operable selectively to engage one or the other of said segment ends and apply circumferentially directed actuating forces to the engaged ends, a second pair of auxiliary segments arranged in end to end relation and expansible into gripping engagement with said other cylindrical surface, a member mounted to oscillate about said axis and connected to said lever means to actuate the latter in the direction of roation of said surfaces, stops on said member selectively anchoring the ends of said auxiliary segments, lever means operable selectively to engage the ends of said auxiliary segments and apply circumferentially directed forces to the engaged ends, and operating means operable selectively to actuate said last mentioned lever means in a direction determined by the rotation of said surfaces.

18. A friction brake for use with a drum and two internal cylindrical surfaces axially offset relative to each other and rotatable in unison about the drum axis, said brake comprising a main friction element adapted for radial expansion and contraction, non-rotatable means anchoring said element, an anchor member mounted to turn about the axis of said element, means connecting said anchor member and said element to expand the latter on movement of the anchor member in either direction away from a normal brake-released position, an auxiliary radially expansible friction element comprising a plurality of annularly spaced separate drum-engaging parts each having a peripheral surface of more than a right angle and less than a half circle, each of said parts being adapted to anchor on said member at one end or the other of the parts depending on the direction of rotation of the braking element with which they engage, and selectively controllable means for applying to the ends of each of said parts individual actuating forces directed circumferentially whereby separate self-energizing effects are built up in each of said parts and applied to said anchor member.

19. The combination of a rotatable part having adjacent friction surfaces concentric with a common axis, a main non-rotatable friction element radially movable into gripping engagement with one of said surfaces, a friction device comprising driving and driven friction elements smaller than said surfaces and disposed within the latter and concentric with said axis, said elements being adapted for axial gripping engagement to derive an actuating force from the momentum of said part, means for amplifying said actuating force including a second friction device having a driven member engageable with the other of said drum surfaces, and means for actuating said driven friction member in response to angular movement of said driven friction element, a member angularly movable about the axis of said part and providing an anchor for said driven friction member, and means connecting said anchor member to said main friction element to actuate the latter in response to gripping engagement of said driving and driven members.

20. A friction brake for use with means providing two internal cylindrical surfaces concentric with and rotatable in unison about a common axis, said brake comprising a main friction element adapted for engagement with one of said surfaces and having circumferentially separable ends, an anchor for said ends, lever mechanism projecting inwardly from and fulcrumed adjacent the friction surface of said element to swing in either direction away from a normal brake-released position and move one end or the other of said element circumferentially away from said anchor, a member mounted to turn about the drum axis and connected to said lever mechanism to actuate the latter and expand said element, an auxiliary friction element being adapted for engagement with said other drum surface and having separable ends adapted to anchor on said member, and control means operable selectively to move one or the other ends of said auxiliary element circumferentially away from its anchor in the direction of rotation of the drum surface with which the auxiliary element is associated.

21. A friction brake for use with a rotatable drum and two internal cylindrical surfaces rotatable therewith, said brake comprising a main friction element expansible into gripping engagement with one of said surfaces when the brake is mounted within said drum, an auxiliary friction element extending around the other surface and having separable ends on one side thereof, a member anchoring said ends and mounted to turn about the drum axis, means carried by said member and movable relative thereto to cause selective circumferential movement of one of said ends in the direction of drum rotation toward the other end, whereby to expand said auxiliary element against its coacting surface and cause said anchor member to shift angularly, and expanding means for said main friction element actuated by movement of said member in either direction away from normal brake-released position following expansion of said auxiliary element.

22. A friction brake adapted to be mounted within a rotatable drum having two axially spaced internal cylindrical surfaces, said brake when so mounted comprising a main friction element expansible into gripping engagement with one of said surfaces, an auxiliary friction element expanding around the other surface and having separable ends on one side thereof, a member for anchoring said ends mounted to turn about the drum axis, a lever pivoted on said anchor member and swingable in opposite directions from a normally brake-released position to separate said ends circumferentially, means for swinging said lever in a direction determined by the direction of drum rotation to cause one of said ends to be moved circumferentially away from its anchor, and means connecting said member and said main friction element to expand the latter in response to movement of the member in either direction away from normal brake-released position following expansion of said auxiliary element.

23. A friction brake having, in combination, a main friction element adapted for radial expansion of its peripheral surface, an auxiliary friction element adjacent said main element having separable ends on one side thereof and adapted for radial expansion of its peripheral surface upon separation of said ends, a member anchoring said ends and mounted to turn about the axis of said surfaces, an expanding device mounted on said anchor member for movement relative thereto in either direction away from a normal brake-released position and operable in such movement to shift one or the other of said ends away from its anchor according to the direction of rotation of the drum surface with which said element surfaces engage, actuating means for said expanding device carried by said anchor member and adapted for movement relative thereto, and means connecting said member and said main friction element and operable to expand the latter in response to movement of said member in either direction away from a normal brake-released position.

24. A friction brake having, in combination, a main friction element adapted for expansion of its peripheral surface by separation of its ends circumferentially, a non-rotatable backing plate providing an anchor for said element, a ring journaled on said backing plate on the inner side thereof and within said friction element to turn about the axis of said element, an auxiliary radially expansible friction element having separable ends on one side thereof adapted to anchor on said ring at a point angularly spaced from the ends of said main friction element, expanding means for said auxiliary element mounted on said ring for movement relative thereto, and means connecting said member and said main friction element and operable to separate the ends thereof and expand the element in response to movement of said member in either direction away from a normal brake-released position following gripping engagement between the auxiliary element and its coacting rotatable surface.

25. A friction brake having, in combination, main and auxiliary friction elements having substantially complete annular external friction surfaces and each having circumferentially separable ends, a member mounted to turn about the axis of said surfaces and providing anchorage for said auxiliary element, means operable selectively in accordance with the direction of rotation of the friction surface with which said element surfaces coact to actuate one or the other end of said auxiliary element to expand the full length of the latter into effective gripping engagement with such coacting surfaces, and means operable selectively by movement of said member in either direction following expansion of said auxiliary element to expand the full length of said main friction element, one of said elements being divided into a plurality of angularly spaced parts individually anchored and actuated so as to constitute the seats of separate self-energizing effects.

26. A friction brake having, in combination, a main friction element having a radially expandible outer peripheral surface, a member movable in opposite directions about the axis of said surface, means actuated selectively by movement of said member in either direction away from a normal brake-released position to expand said element, a plurality of auxiliary friction elements angularly spaced around said axis for expansion into gripping engagement with substantially the entire circumference of a rotatable drum surface, means on said member providing anchors for opposite ends of each of said auxiliary elements, a plurality of actuating devices for each of said auxiliary elements respectively associated with the opposite ends thereof and movable selectively in either direction to move one end of the associated element circumferentially away from its anchor and expand the element against its rotating surface, and means for operating one expanding device of each of said auxiliary elements in unison and in corresponding directions, whereby to cause separate self-energizing forces to build up in the respective auxiliary elements substantially throughout the lengths of the latter.

27. A friction brake having, in combination, a main friction element having a radially expandible peripheral surface, a non-rotatable anchor therefor, a member mounted on said non-rotatable anchor to turn about the axis of said surface, means actuated selectively by movement of said member in either direction away from a normal brake-released position to expand said element, an auxiliary friction element adjacent to and coaxial with said main element and having a radially expandible peripheral surface, said auxiliary element being anchored on said member, an actuating member carried by and journaled on said member to turn relative thereto about said axis, and expanding means for said auxiliary element actuated selectively in response to turning of said actuating member relative to said anchor member.

28. A friction brake adapted to be mounted within a rotatable drum closed at one end and open at the other and rotatable with two internal cylindrical surfaces disposed with their center lines offset relative to each other along said axis, said brake when mounted within said drum comprising a main friction element having separable ends and expandible into gripping engagement with the one of said surfaces nearer the open end of the drum, a non-rotatable anchoring means for said ends, a member journaled on said anchoring means to turn about the drum axis, means actuated selectively by movement of said member in opposite directions away from a normal brake-released position to move the respective ends circumferentially away from their anchors and expand said element, an auxiliary friction element having separable ends adapted to anchor on said member, a friction element disposed within the drum and adjacent the closed end thereof and having a friction surface rotatable with the drum and facing axially toward the open end thereof, a driven friction element adapted for gripping engagement with said axially facing surface to move therewith in the direction of drum rotation, means actuated by said driven friction element and operable selectively to move one end or the other of said auxiliary element circumferentially to expand the element against its rotating surface and thereby cause angular motion of said member, and means selectively controlling the gripping engagement between said driven element and said axially facing surface.

29. A friction brake mechanism having, in combination, an expansible friction element having a non-rotatable anchor, a lining of friction material carried on the external surface of said element, a second expansible friction element coaxial with respect to said first element and having a circumferentially floating anchor, a second substantially thinner lining carried on the external surface of said second element, means connecting said floating anchor to said first element to expand the element as said second element moves angularly with the drum, and selectively controllable means for expanding said second element, said elements and the expanding means being constructed to produce greater unit pressures on said first lining than on the second and wearing out of the two after approximately the same length of service use.

30. A friction brake for use with a rotatable drum and two separate internal cylindrical surfaces rotatable therewith, said brake comprising a main friction element having an external periphery expansible into gripping engagement with one of said surfaces when the brake is mounted within said drum, a non-rotatable anchor for said main friction element having an axially projecting hub concentric with and disposed within said friction element, an auxiliary friction element extending around the other surface and having separable ends on one side thereof, a member anchoring said ends and journaled on said hub to turn about the drum axis, means carried by said member and movable relative thereto to cause selective circumferential movement of one of said ends in the direction of drum rotation toward the other end, whereby to expand said auxiliary element against its coacting surface and cause said anchor member to shift angularly, and expanding means for said main friction element actuated by movement of said member in either direction away from normal brake-reelased position following expansion of said auxiliary element.

JOHN GEORGE OETZEL.